March 23, 1937.  E. J. MARTEL  2,074,616
AUTOMOBILE TIRE CHAIN
Filed June 28, 1934
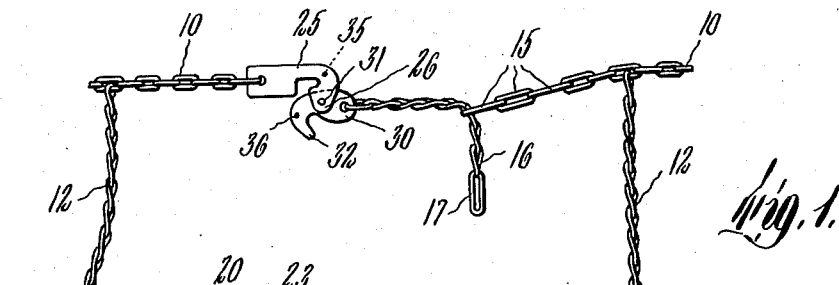
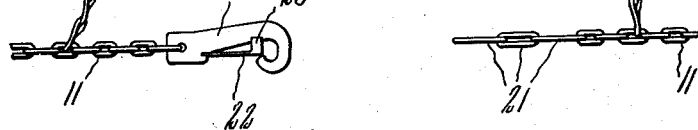
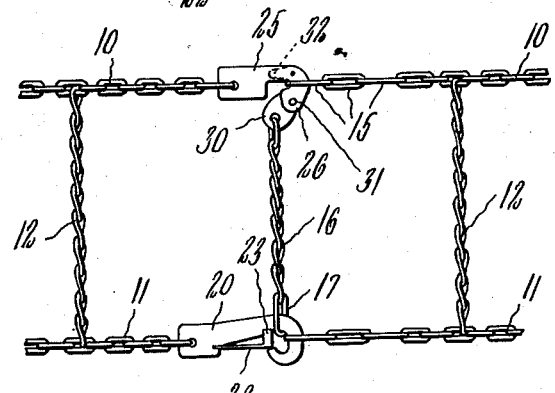
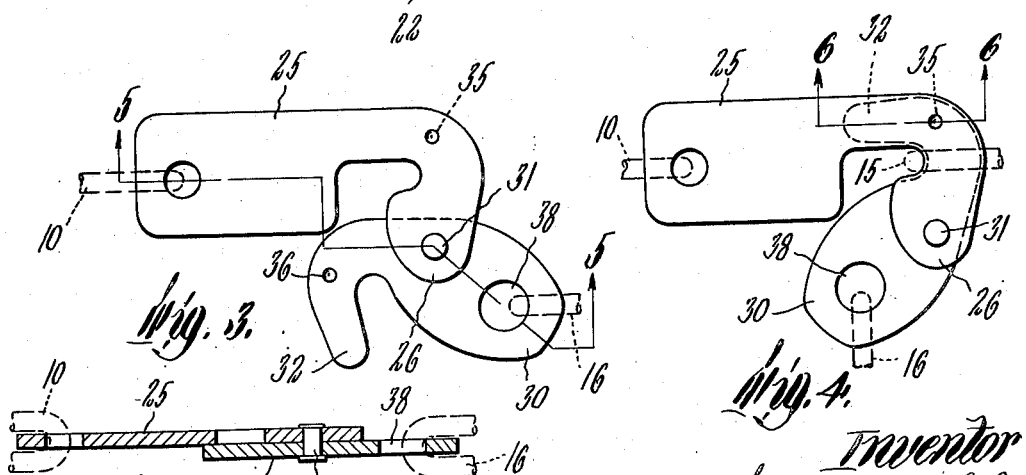
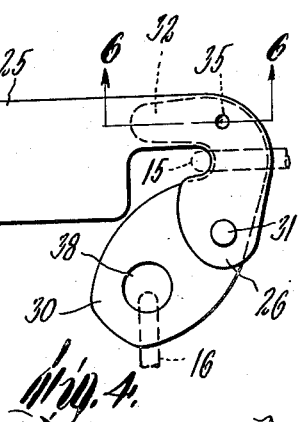
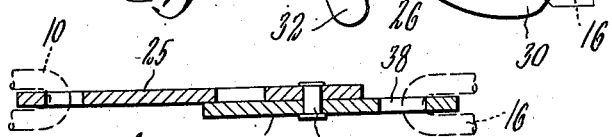
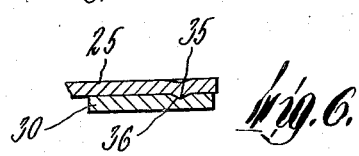
Inventor
Edgar J. Martel
by Wright, Brown, Quinby May
attys.

Patented Mar. 23, 1937

2,074,616

UNITED STATES PATENT OFFICE 2,074,616

AUTOMOBILE TIRE CHAIN

Edgar J. Martel, Laconia, N. H.

Application June 28, 1934, Serial No. 732,877

5 Claims. (Cl. 152—14)

This application is a continuation-in-part of my copending application Serial No. 711,706, filed February 17, 1934. The invention relates to improvements in automobile tire chains such as are widely used for reducing the danger of skidding when driving on snowy or muddy roads. It is an object of the invention to provide a chain which can be easily attached to and removed from a tire, and which will stay firmly in place when secured.

The present invention has to do with a tire chain of the kind described and claimed in my Patent No. 1,905,237, granted April 25, 1933. Such a chain is characterized by two side members, preferably of chain, which are adapted to lie along the opposite side faces of a tire and which are connected at intervals by cross links which pass across the tread of the tire. When the tire chain is not in use, the side members are free at both ends so that the chain can be laid out flat on the ground when it is desired to attach it to a tire. The side member which is intended to lie against the inner side face of the tire, that is, the side of the tire which is difficult of access, is provided with an eye at one end and an extension at the other end which is adapted to slide through the eye and then be passed across the tread of the tire to be secured to the two ends of the other side member.

According to the present invention, I connect between the extension and the inner side member a detent device which is adapted to prevent sliding of the extension through the eye when the tire is adjusted to position for use. I also provide a releasing device which is operable by manipulation of the end portion of the extension to release the eye from the detent device so that, in removing the chain from a tire, it will not be necessary for the operator to reach behind the tire. In attaching a chain to a tire, it will be necessary to reach behind the tire only to thread the end of the extension through the eye.

For a more complete understanding of the invention, reference may be had to the description of an embodiment thereof which follows, and to the drawing, of which Figure 1 is a fragmentary view of a tire chain embodying the invention.

Figure 2 is another view of the same showing the parts in the positions they occupy when the chain is secured for operation.

Figure 3 is an elevation of the detent and release devices.

Figure 4 is an elevation of the same, showing the parts as they appear when the chain is secured.

Figure 5 is a section on the line 5—5 of Figure 3.

Figure 6 is a section on the line 6—6 of Figure 4.

The tire chain, as illustrated in Figures 1 and 2, may for the most part be of any desired construction. As shown, it includes an inner side member 10 and an outer side member 11, these members consisting of suitable lengths of chain adapted to occupy a circular shape when in use and to lie against the respective side faces of the tire on which the chain is mounted. These side members may be connected at suitable intervals by cross links 12 which customarily consist of short lengths of chain extending from one side member to another across the tread of the tire. At one end of the inner side member 10, one or more eyes 15 or equivalent elements are provided for slidable engagement with flexible extension 16 on the opposite end of the side member 10. Three such edges or long links are shown on the drawing for selective use with the extension 16 according to the size of the tire to which the chain is applied. The eyes 15 may be of any convenient size or shape through which the extension 16 can slide. The end 17 of the extension 16 is adapted to be secured to the two ends of the side member 11 when the chain is in position for use. To this end, a hook or clasp 20 may be secured to one of the ends of the side member 11, this clasp being adapted to receive and secure an eye 21 at the opposite end of the side member 11 as well as the end 17 of the extension 16. As is evident from Figure 2, the extension 16 is intended to be drawn through the eye 15 and across the tread of the tire so that its end 17 can be secured by the clasp 20. A plurality of eyes 21 may be provided, three being shown on the drawing to correspond to the three eyes 15 on the inner side member for the purpose of fitting tires of different sizes. To facilitate the operations of attaching and detaching the chain, the clasp 20 may be in the form of a spring hook having a resilient member 22, preferably a flat leaf spring, extending across the throat of the hook and pressing against the inner side of the tip of the hook. The spring 22 may be provided at its free end with one or two ears 23 adapted to engage the side faces of the shank of the hook. These ears act as guards to prevent the eye 21 from working over onto the spring 22 and springing it clear of the hook. It sometimes happens that a chain, which fits perfectly upon a tire when the latter is fully inflated, becomes somewhat loose when the pressure of the tire diminishes considerably. In order to avoid working of the extension 16 through the eye 15 by road reaction on portions of the chain, especially in case of the development of slack in the members of the chain owing to partial deflation of the tire, I connect between the extension 16 and the adjacent end of the side member 10 a detent device 25, which, as shown, may be in the form of a hook having a curved portion 26. When this hook is pulled through the eye 15 so that the eye is seated in the curve of the hook, it is evident that the extension 16 will be held against reverse sliding movement through the eye 15 such as would produce slack in the side member 10. This serves to prevent the development of excessive slack in the side member 10 in case moderate slack develops in all portions of the tire chain owing to partial deflation of the tire. The eye 15 is preferably retained more securely in the hook 26 by a member which substantially closes the hook when the chain is in position for use. This member may comprise a hook 30, the shank of which is pivoted to the hook 26 near the end thereof as at 31. As indicated in Figure 4, the shank of the hook 30 closes or nearly closes the hook 26 when the chain is ready for use, the hook portion 32 of the hook 30 at such times registering with the hook portion 26. A yielding detent may be employed to hold the hook members 25 and 30 releasably in working position so as to prevent unnecessary wear on the pivot 31 and to keep the hook 26 practically closed while the chain is in use. This detent may be in the form of a small projection 35 from a face of one of the hooks, which enters a corresponding depression 36 in the adjacent face of the other hook. The hook 32 also has the function of discharging the eye 15 from the hook 26. For this purpose the end extension 16 is attached to the shank of the hook member 30 as at 38, so that, when the chain is removed from the tire, the extension 16 is disconnected from the clasp 20 and is jerked to the right, as in Figures 1 and 2. This swings the hook member 30 on its pivot 31 and the hook 32 carries the eye 15 out of the hook 26 so that the extension 16 can slide readily through the eye 15. In applying the chain to a tire without jacking up the wheel, the chain may be laid out flat on the road or floor and the wheel may be run onto the mid-portion thereof. The ends are carried up around the periphery of the tire and the extension 16 is threaded through one of the eyes 15 according to the tire size. The extension is drawn through the eye until the eye is seated in the hook 26. The extension is then led directly across the tread of the tire in a direction at right angles to the side member 10, as indicated in Figure 2, and the clasp 20 is hooked onto the end-link 17 of the extension and one of the eyes 21 corresponding to the eye 15 engaged in the hook 26. To remove the chain from the tire, the end-link 17 and the eye 21 are disengaged from the clasp 20. The extension 16 is pulled toward the right as in Figure 1, causing the hook 32 to eject the eye 15 from the hook 26. The extension thereupon slides through the eye 15 and the ends of chain thus become entirely disconnected from each other.

It is evident that various modifications and changes may be made in the embodiment of the invention herein described and illustrated without departing from the spirit or scope of the invention as defined in the following claims.

I claim:—

1. In an automobile tire chain, an eye, a flexible member slidable through said eye, a detent device connected in said member and adapted to form a substantially closed loop linked with said eye to prevent sliding of said member through said eye when the portions of the member attached to said device lead off in directions at right angles to each other, and means operable by changing the angle between said directions to open said loop.

2. In an automobile tire chain, an eye, a flexible member slidable through said eye, a detent device connected in said member and adapted to form a substantially closed loop linked with said eye to prevent sliding of said member through said eye when the portions of said member attached to said device lead off in directions at right angles to each other, and means in said device for releasably maintaining said loop of said device substantially closed.

3. In an automobile tire chain, a flexible side member having an extension with a free end and an eye at its other end through which said extension is slidable, and a releasable detent device connected into said extension, said device comprising a pair of hooks pivotally connected together, the pivot being on the shank of the hook nearest to the free end of the extension and near the extreme end of the other hook.

4. In an automobile tire chain having longitudinal side member, an eye at one end of a side member, a detent device attached to the other end of said member, and a flexible extension attached to said device and adapted to slide through said eye, said device consisting of two pivotally connected elements forming a substantially closed loop link with said eye when the flexible extension leads therefrom in a direction at right angles to the side member, one of said elements having a portion acting to eject said eye from engagement with the other said element when said flexible element is pulled in an oblique direction with respect to said side member.

5. An automobile tire chain having a pair of flexible side members connected at intervals by cross links, said members having terminal eyes at one end thereof equally distant from the nearest cross link, said members having hooks at their other end equally distant from the nearest cross link and each adapted to detachably engage the eye at the opposite end of the same side member, and a flexible extension attached to one of said hooks and slidable through the corresponding eye for releasable engagement with the other said hook.

EDGAR J. MARTEL.